Patented Mar. 6, 1923.

1,447,568

UNITED STATES PATENT OFFICE.

JOSEPH PELC, OF CICERO, ILLINOIS.

PROCESS OF TREATING LIME-CONTAINING MATERIALS.

No Drawing.  Application filed August 30, 1921. Serial No. 496,963.

*To all whom it may concern:*

Be it known that I, JOSEPH PELC, a citizen of the United States, residing at Cicero, in the county of Cook and State of Illinois, have invented certain new and useful Improvements in Processes of Treating Lime-Containing Materials, of which the following is a specification.

This invention relates to a process of making mortar, plaster, or cement for such uses as mortar, plaster, or cement are applied to, and to the plaster, mortar, or cement produced by this process.

The object of this invention is the addition of a mixture of alkali sulfates or bisulfates, together with any fluoride salt or ore to calcium oxide, calcium hydroxide, or other calcium salts or such mixtures of these substances which are intended for the use as mortars, plasters, or cements. This addition is accomplished in the case of mortar by simply mixing lime with the mixture of alkali sulfate or bisulfate and fluoride before or after water is added to mortar and then using this mixture in the same way as any mortar is used. With plasters and cements, the mixture of alkali sulfates or bisulfates and fluoride is mixed either by hand or by any mechanical mixer, but in all these cases, there is no special machinery necessary which is an advantage of this process. It is advantageous in the case of plasters or cements which are to be calcined to add this mixture before calcination and calcine it together with the rest of plaster or cement material.

The chemical process taking place is explained as follows:

When alkali sulfate or bisulfate is added to calcium hydroxide, the following reaction takes place:

(1). $Ca(OH)_2 + Na_2SO_4 \rightleftharpoons CaSO_4 + 2NaOH$.

This serves as a general illustration. With an excess of calcium hydroxide disregarding water which is present together with sand, the following solid solution system is formed at this incipient stage:

(2). $CaSO_4 + NaOH + Ca(OH)_2$.

Of this mixture, the principal agents for the absorption of carbon dioxide are:

(3). $NaOH + Ca(OH)_2$.

The amount of sulfates or bisulfates of alkali metals is so regulated, according to the composition of the individual samples of lime, and place in which the mortar is to be used, that the concentration of NaOH or KOH is never less than two and never more than twenty five per cent of the final mixture. From physico-chemical measurements and practical trials, I have found that this mixture (3) otherwise commonly known in the dry state as soda-lime when properly regulated as to the composition of lime and place where the mortar is to be used, is capable of increasing the velocity of absorption of carbon dioxide by from twenty to eighty times calculated on the basis of the absorption of carbon dioxide by calcium hydroxide mixture with sand and water. The following reaction takes place:

(4). $Ca(OH)_2 + NaOH + 2CO_2 \rightleftharpoons CaCO_3 + NaHCO_3 + H_2O$.

I have found in my experiments by using organic derivatives like alkyl and acyl compounds that in this solid or semi-solid solution both carbonates form a complex salt of the following structure:

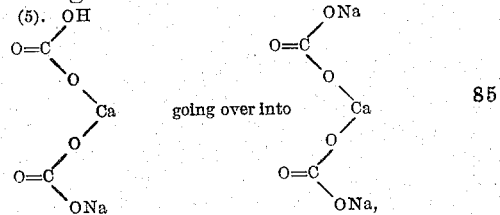

calcium sodium carbonate which salt behaves, however, as a true intermediate catalytic salt, being very unstable and with the excess of lime going over into its components, calcium carbonate and sodium carbonate. Besides that, this salt is more soluble than sodium carbonate and for that reason mortars, plasters or cements mixed with alkali sulfates alone are unstable in moist atmosphere. It is explained below that I have found to overcome this difficulty without resorting to calcination or other similar processes, as it is done in plasters and cements.

In ordinary mortars, or plasters and cements to which lime is added either intentionally or accidentally or in which it is formed by hydrolysis of salts, the following equilibrium is formed.

(6). $Ca(OH)_2 + CO_2 \rightleftharpoons CaCO_3 + H_2O$, or a period of rest ensues with only a part of lime changed into carbonate. But in my process, the formation of the complex salt of calcium sodium carbonate is a first step in the catalytic action of NaOH or KOH as accelerator for the formation of calcium carbonate, because of breaking down of this complex salt with the excess of lime not only into calcium carbonate and sodium carbonate, but also into calcium carbonate and sodium or potassium hydroxide as follows:

(7). $Ca(NaCO_3)_2 + Ca(OH)_2 \rightarrow 2CaCO_3 + 2NaOH$, the reaction being irreversible.

Thus, NaOH is regenerated, the whole process is repeated until all or nearly all lime is changed into carbonate. This change in my process takes months or even only weeks, depending upon conditions under which the mortar is being used. The real catalytic agent in my process therefore, is molecules of NaOH or KOH, finely subdivided, intimately combined and formed during the process which absorb carbon dioxide with twenty to eighty times greater velocity than lime alone, forming salts of a strong base with a weak acid which in the presence of mortar readily hydrolyze, giving up their $CO_3$ ions to lime. These finely subdivided molecules of caustic alkali are even more efficient as to the absorption of carbon dioxide than ordinary soda-lime in dry state. The real driving force which we may call free energy of acceleration rests entirely in the equilibria as indicated by above equations, and as I have found the simple addition of caustic alkali could not accomplish the same purpose even if caustic alkali would not be ten times more expensive than the material I propose to use as indicated below.

There is another highly important point which explains clearly why NaOH molecules can act and do act as catalytic agent. In the absorption of carbon dioxide by NaOH or KOH, but better yet in the absorption of caustic alkalies by carbon dioxide, there is only a simple process involving two steps:

(a) simple absorptive formation of $NaHCO_3$ (b) formation of $Na_2CO_3$ by splitting off water.

Even in this way, therefore, the molecules of caustic alkali can act as catalytic agent and do act, because the next step to calcium carbonate is only a simple metathesis.

But this thing is not so simple as to calcium hydroxide. This explanation must be advanced, because it would seem contradictory to all known facts that calcium hydroxide should be weaker base than sodium or potassium hydroxide. Calcium hydroxide is a diacid base and carbonic acid is a diabasic acid, besides that we have in mortar molecules of gaseous $CO_2$ which really absorb calcium hydroxide. This process is complicated first by the primary and secondary dissociation of both calcium hydroxide and carbonic acid. Second, the absorption by carbon dioxide goes on in steps which, disregarding structural formulas, are illustrated as follows:

(a). $CO_2 + Ca(OH)_2 \rightarrow Ca(OH)HCO_3$
(b). $CO_2 + Ca(OH)(HCO_3) \rightarrow Ca(HCO_3)_2$
(c). $Ca(HCO_3)_2 + Ca(OH)_2 \rightarrow Ca_2(CO_3)(OH)(HCO_3) + H_2O$
(d). $Ca_2(CO_3)(OH)(HCO_3) + Ca(OH)_2 \rightarrow Ca_3(OH)_2(CO_3)_2 + H_2O$
(e). $Ca_3(OH)_2(CO_3)_2 + CO_2 \rightarrow Ca_3(CO_3)_2(OH)(CO_3H)$
(f). $Ca_3(CO_3)_2(OH)(HCO_3) + CO_2 \rightarrow Ca_3(HCO_3)_2(CO_3)_2$
(g). $Ca_3(HCO_3)_2(CO_3) + Ca(OH)_2 \rightarrow Ca_4(OH)(HCO_3)(CO_3)_3 + H_2O$
(h). $Ca_4(OH)(HCO_3)(CO_3)_3 + Ca(OH)_2 \rightarrow Ca_5(OH)_2(CO_3)_4$ These formulas illustrate clearly the highly complicated nature of the absorption of calcium hydroxide by carbon dioxide which complicity I propose to remove by the use of caustic alkali which form simple absorption products. I want to add that although these formulas might seem complicated, there are more complications, if we take in account different chemical and physical equilibria, the breaking down of these salts and formation of the original substances and for these reasons also, the caustic alkali formed in my process accelerates the formation of calcium carbonate.

All or nearly all of these complicated salts are really found in the samples of old mortar, as I have found myself by the examination of such samples. Some of them can be isolated by known methods in organic chemistry, because they are well preserved, a crust of calcium carbonate being on the outside and the mixture of these products inside together with calcium carbonate and free lime. The whole process represents a marvelous phenomenon of the growth of inorganic matter, because under favorable circumstances and with limited supply of air and moisture and in the absence of any catalytic agent to break down these complexes, it can go on nearly indefinitely. But for the building purposes, this phenomenon is less interesting than it is destructive and for that reason, I propose to remove it by the use of such catalytic agents as caustic alkalies formed in my process, especially NaOH.

I have mentioned the fact that any soluble salts like alkali carbonates would be entirely objectionable in the final product in the following solid solution of mortar:

(8.) $CaSO_4 + CaCO_3 + Na_2CO_3$, because they make mortar, plaster, or cement less resistant to moisture and to the changes of temperature. For that reason, I propose to remove this soluble carbonate by the addition of any fluoride salt or ore which is added directly mixed with the alkali sulfates or bisulfates. I have also found that calcium fluoride, commonly known as fluorspar, is to be preferred. The fluoride remains unchanged in contact with lime as long as there is an excess of lime present and therefore no sodium carbonate, as proved above, because there is a preference to form calcium carbonate, as follows:

(9). $Ca(OH)_2 + Na_2CO_3 \rightarrow CaCO_3 + 2NaOH$

But, as soon as all or nearly all the lime is changed into calcium carbonate, as indicated in equation (8), the sodium carbonate present combines with fluoride to form a stable fluoride nearly insoluble in this concentration, as follows:

(10). $Na_2CO_3 + CaF_2 \rightarrow CaCO_3 + 2NaF$.

The final product consists of:

(11). $CaSO_4 + CaCO_3 + NaF$, and was formed by combination of all constituents as the following combined equation shows:

(12). $Ca(OH)_2 + Na_2SO_4 + CaF_2 + CO_2 \rightarrow CaCO_3 + CaSO_4 + 2NaF + H_2O$ The sand, silicon dioxide, and water which are regular constituents of mortar under the conditions of my process greatly improve the absorption of carbon dioxide, water by hydrolysis of the complex salt as formed in equation (5), and sand by helping in the fine subdivision and even and regular distribution of the molecules of NaOH so that even in this direction my process shows a great improvement against the old methods utilizing them in the acceleration of $CO_2$ absorption.

It is, however, also necessary to show that even calcium sulfate and sodium fluoride are desirable and not objectionable in the final product and that they improve the mortar made by this process. It is obvious that calcium sulfate accelerates hardening of mortar, because, as I found, sodium fluoride constantly takes water from the mixture and from calcium sulfate helping thus in drying the final product. This is done by the virtue of the fact that sodium fluoride has no tendency to hold water in chemical or physical combination, and being in intimate solid solution with the other components, it is constantly pressing water out. Both salts, calcium sulfate and sodium fluoride, form such an intimate combination with calcium carbonate, that they lower the eutectic point of the solid solution and thus make mortar more stable against such changes of temperature as frost and excessive heat. By their fine dispersion, in nearly colloidal state, they induce such a combination between calcium carbonate and sand that they prevent cracking of the finished product. Finally, the fluoride acts as an excellent preservative against the disintegration of mortar by organic nitrogenous matter or by the atmospheric mixture of nitrogen and oxygen, preventing the formation of nitrates or other nitrogenous salts.

The amounts of fluoride to be used in the process are dependent upon the amounts of alkali sulfates and bisulfates and can be obtained by a simple calculation from the chemical equations given fully above.

In the case of plasters or cements, the process is practically the same, because the mixture of alkali sulfates with a fluoride and the catalyzer as explained above act upon free lime in plasters or cements either added intentionally or accidentally or formed by hydrolysis as in the case of calcium silicates or aluminates. All free lime is again changed into carbonate and for that reason the process is to be preferred in the plasters or cements wherever lime is used or its formation during the process of hydrolysis is expected. Simple mixing with plaster or cement material with the mixture of alkali sulfates or bisulfates and fluoride is sufficient, but calcination such as practiced in making plasters or cements is advantageous.

I have finally found that of all alkali sulfates and bisulfates, sodium bisulfate, commonly known as niter cake which is a by-product, in nitric acid manufacturing, can be used with a good advantage for its cheapness, when it is properly neutralized and freed of nitrogen oxides or acids.

While I have described in detail the preferred practice of my process, it is to be understood that the details of procedure, and proportion of ingredients may be widely varied, and that known chemical equivalents may be employed in place of the materials mentioned, without departing from the spirit of the invention or the scope of the subjoined claims.

Having thus described my invention, I claim:

1. The process of accelerating the hardening of lime containing materials which comprises adding a mixture of an alkali metal sulfate and calcium fluoride thereto.

2. The process of accelerating the hardening of lime containing materials which comprises adding a mixture of a sulfate of sodium and calicum fluoride thereto.

3. The process of accelerating the hardening of lime containing materials which comprises adding a mixture of a hydrogen containing alkali metal sulfate, and calicum sulfate thereto.

4. The process of accelerating the hardening of lime containing materials which comprises adding a mixture of nitre cake and calcium fluoride thereto.

5. The process of accelerating the hardening of lime containing materials which comprises adding an alkali metal sulfate thereto to form calcium sulfate and an alkali metal carbonate, and treating with calcium fluoride to remove the alkali metal carbonate.

6. The process of accelerating the hardening of lime containing materials which comprises adding a hydrogen containing alkali metal sulfate thereto to form calcium sulfate and an alkali metal carbonate, and treating with calcium fluoride to remove the alkali metal carbonate.

7. The process of accelerating the hardening of lime containing materials which comprises adding a sulfate of sodium thereto to form calcium sulfate and sodium carbonate and treating the material with calcium fluoride to remove the sodium carbonate.

8. The process of accelerating the hardening of lime containing materials which comprises adding nitre cake thereto to form calcium sulfate and sodium carbonate and treating the material with calcium fluoride to remove the sodium carbonate.

In testimony whereof I affix my signature in presence of two witnesses.

JOSEPH PELC.

Witnesses:
JAMES HRDLICKA.
Mrs. ROSE PELC.